United States Patent
Greve

(10) Patent No.: US 9,837,870 B2
(45) Date of Patent: Dec. 5, 2017

(54) WATER-RESISTANT MOTOR AND END BELL

(71) Applicant: Laitram, L.L.C., Harahan, LA (US)

(72) Inventor: Christopher G. Greve, Covington, LA (US)

(73) Assignee: Laitram, L.L.C., Harahan, LA (US)

( * ) Notice: Subject to any disclaimer, the term of this patent is extended or adjusted under 35 U.S.C. 154(b) by 324 days.

(21) Appl. No.: 14/818,529

(22) Filed: Aug. 5, 2015

(65) Prior Publication Data

US 2016/0149460 A1     May 26, 2016

Related U.S. Application Data

(60) Provisional application No. 62/084,364, filed on Nov. 25, 2014.

(51) Int. Cl.
    *H02K 5/12*            (2006.01)
    *H02K 5/10*            (2006.01)
    *H02K 5/16*            (2006.01)

(52) U.S. Cl.
    CPC ............ *H02K 5/10* (2013.01); *H02K 5/16* (2013.01); *H02K 2205/09* (2013.01)

(58) Field of Classification Search
    CPC ........ H02K 5/10; H02K 5/16; H02K 2205/09; H02K 5/15; H02K 5/04; H02K 15/14
    USPC ..... 310/88–89, 400–402, 405–408, 421, 424
See application file for complete search history.

(56) References Cited

U.S. PATENT DOCUMENTS

| | | | | |
|---|---|---|---|---|
| 4,086,507 | A * | 4/1978 | Roland | H02K 5/10 310/88 |
| 4,186,319 | A * | 1/1980 | Dochterman | H02K 5/15 220/327 |
| 5,127,148 | A * | 7/1992 | Lykes | H02K 5/15 29/596 |
| 5,412,272 | A * | 5/1995 | Mensching | H02K 5/132 310/112 |
| 6,188,156 | B1 * | 2/2001 | Maldeney | H02K 5/15 29/596 |
| 7,420,302 | B2 * | 9/2008 | Archer | H02K 5/15 310/68 R |
| 8,410,643 | B2 * | 4/2013 | Kottmyer | H02K 5/08 310/216.114 |
| 8,482,173 | B2 * | 7/2013 | Wright | F04D 13/06 310/400 |
| 8,749,110 | B2 * | 6/2014 | Wong | H02K 1/17 310/154.22 |

FOREIGN PATENT DOCUMENTS

| | | |
|---|---|---|
| JP | 5044164 B2 | 10/2012 |
| JP | 2014-110697 A | 6/2014 |
| JP | 5547783 B2 | 7/2014 |

* cited by examiner

*Primary Examiner* — Thanh Lam
(74) *Attorney, Agent, or Firm* — James T. Cronvich

(57) ABSTRACT

A water-resistant electric motor having an end bell with a passage that prevents the formation of a vacuum between the shaft seal and the shaft bearing. The passage extends from the interior region of the motor through the end bell bypassing the bearing to communicate with a gap between the seal and the bearing. The motor housing includes a vent to expose the motor's interior region and the gap to atmospheric pressure or to a source of higher-pressure air or gas to prevent water from being sucked into the motor's interior.

14 Claims, 2 Drawing Sheets

WATER-RESISTANT MOTOR AND END BELL

BACKGROUND

The invention relates generally to electric motors and more particularly to water-resistant motors.

Electric motors are often used on machines that require a washdown. Sometimes the motors themselves are subjected to powerful sprays that can force water into the motor through any opening in the housing. As shaft seals and seals at the seams of between housing sections wear, the motors become more susceptible to water intrusion. When a hot motor is washed down, the water spray cools the motor. The cooling can cause the air pressure in voids inside the motor to drop. The drop in air pressure in these voids sucks water into the motor. The water that is sucked in can then cause electrical short circuits and motor failure.

SUMMARY

One version of a water-resistant motor embodying features of the invention comprises a motor housing that surrounds an interior region and has an open end. An end bell attached to the motor housing closes the open end. A shaft extends axially outward from the interior region through a central bore in the end bell. The shaft has a bearing region and a seal region axially outward of the bearing region. A rotary bearing attached to the shaft in the bearing region is retained by the end bell. The end bell also retains a seal that contacts the shaft in the seal region. A gap is formed between the rotary bearing and the seal. The end bell has a passage that extends from the interior region of the motor housing to the gap. The passage bypasses the rotary bearing. A vent extends from outside the motor housing through the end bell or the motor housing itself into communication with the interior region and the passage to maintain air pressure at atmosphere or higher in the gap.

In another aspect one version of a motor end bell embodying features of the invention comprises an end face extending radially inward from an outer circumference to a central bore, which defines an axis for a shaft received in the bore. A hub extends axially from the end face to an inner end. The hub defines the central bore. The hub includes a bearing seat bounding a portion of the central bore. The bearing seat has a groove that extends the axial length of the bearing seat to the inner end of the hub.

DETAILED DESCRIPTION

Figure 1:
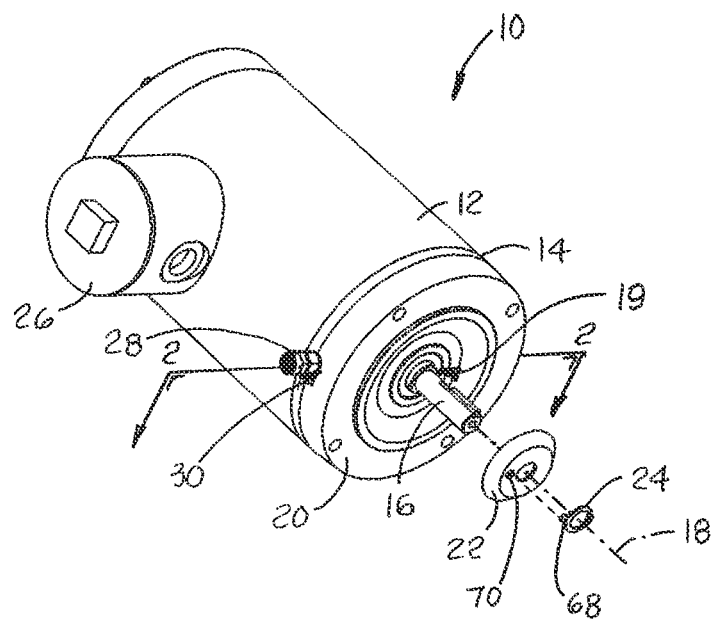
FIG. 1 is an isometric view, partly exploded, of an electric motor embodying features of the invention.
Figure 2:
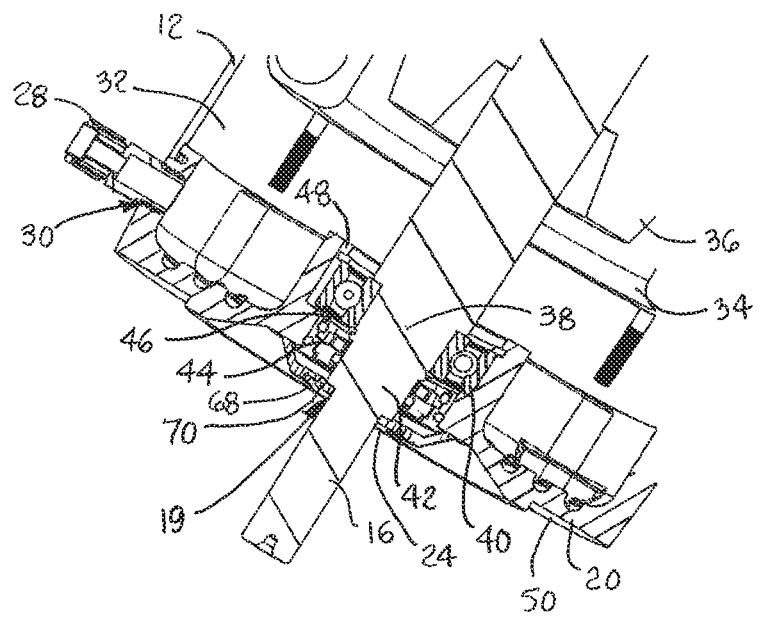
FIG. 2 is a cross section of an end portion of the motor of FIG. 1 viewed along lines 2-2.

A water-resistant electric motor embodying features of the invention is shown in FIG. 1. The motor 10 has a motor housing 12, in this example a cylindrical tube having an open end 14. A drive shaft 16 having an axis 18 extends axially outward of the motor housing 12 through a central bore 19 in an end bell 20. The end bell 20 is bolted to the motor housing 12 to close the open end 14. A splash shield 22 is retained in place on the shaft 16 near the end bell 20 by a shaft retainer, such as a snap ring 24. The splash shield deflects water spray away from the shaft 16 and the bore 19. Electric wires are connected to motor windings in a wiring compartment 26 that opens through the housing 12 into the interior of the motor. An air-pressure fitting 28 fits in a vent 30 that extends through the end bell 20 into the interior of the motor. Alternatively, the vent could be formed in the motor housing 12. As shown in FIG. 2, the motor housing 12 surrounds an interior region 32 of the motor.

The stator 34 and the rotor 36 reside in the interior region 32. The shaft 16 extends from the rotor 36 through the central bore 19 axially outward of the end bell 20. The shaft has a bearing region 38 at which a rotary bearing 40 is attached. The shaft 16 has a seal region 42 axially outward of the bearing region 38. One or more seals 44 contact the shaft 16 in the seal region 42. The seal 44 and the rotary bearing 40 are retained in the end bell 20. A gap 46 is formed between the seal 44 and the rotary bearing 40.

To prevent the air pressure in the gap 46 from dropping below the pressure of the external atmosphere, a passage 48 is formed in the end bell 20. The passage 48 bypasses the rotary bearing 40 and puts the gap 48 in communication with the interior region 32 of the motor and, via the vent 30, through a tube or other sheltered passageway to the external atmosphere or through the fitting 28 to a source of high-pressure air or other gas. In this way, the air pressure in the gap is maintained at or above atmospheric pressure to prevent the suctioning of water through the seal 44 and the rotary bearing 40 into the interior region 32 of the motor 10.

Figure 3:
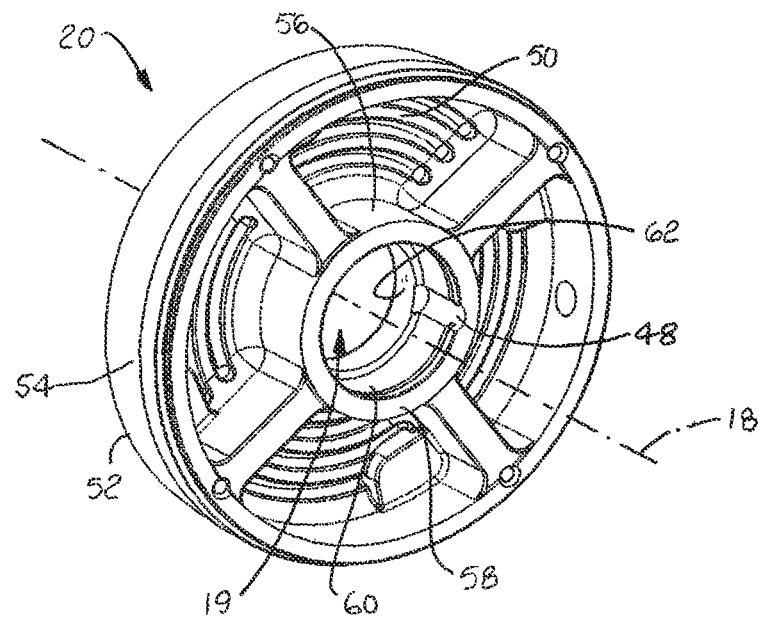
FIG. 3 is an isometric view of the end bell of the motor of FIG. 1.

The passage 48 in the end bell 20 is better shown in FIG. 3. The end bell 20 has an end face 50 (also in FIG. 2) that extends radially from an outer circumference 52 to the central bore 19, which defines the axis 18 for the shaft. An outer shell 54 extends axially from the outer circumference 52 of the end face 50. A hub 56 extends axially from the end face 50 to an inner end 58. The hub 56 defines the central bore 19. The hub 56 has a bearing seat 60 on which the rotary bearing sits. The passage 48 is formed in the bearing seat 60 by a groove extending the axial length of the bearing seat to the inner end 58 of the hub 56.

Figure 4:
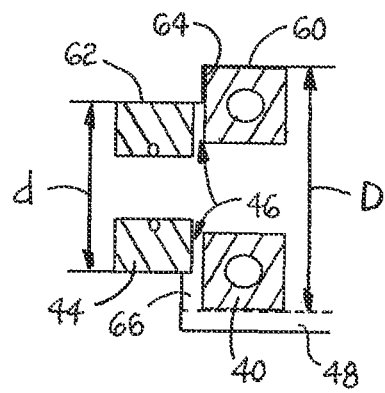
FIG. 4 is a schematic cross section of the bearing region of FIG. 2.

The hub 56 also has a seal seat 62 axially outward of the bearing seat 60. As shown in FIG. 4, in which the shaft is omitted to simplify the drawing, the diameter d of the seal seat 62 is less than the diameter D of the bearing seat 60. So a shoulder 64 is formed at their interface. The rotary bearing 40 rests against the shoulder 64. But the passage 48 extends through the shoulder (as shown at 66) to reach the gap 46.

As shown in FIGS. 1 and 2, the splash shield 22 is retained on the shaft 16 by the snap ring 24. A tab 68 extends radially outward and axially inward from the periphery of the ring to snap into a hole forming a receptacle 70 in the splash shield 22. Because the snap ring 24 fits tight on the shaft 16, the engagement of the tab 68 with the wall of the receptacle 70 causes the splash shield 22 to rotate with the shaft. The rotation of the splash shield 22 flings sprayed water outward away from the rotating shaft 16.

What is claimed is:
1. A water-resistant motor comprising:
    a motor housing surrounding an interior region and having an open end;
    an end bell attached to the motor housing to close the open end and having a central bore;

a shaft extending axially outward from the interior region through the central bore of the end bell, the shaft having a bearing region and a seal region axially outward of the bearing region;

a rotary bearing retained by the end bell and attached to the shaft in the bearing region;

a seal retained by the end bell and contacting the shaft in the seal region, wherein a gap is formed between the rotary bearing and the seal;

the end bell including a passage extending from the interior region of the motor housing to the gap and bypassing the rotary bearing;

a vent extending from outside the motor housing through the end bell or the motor housing into communication with the interior region and the passage to maintain air pressure at or above atmospheric in the gap.

2. A water-resistant motor as in claim 1 wherein the vent is open to the atmosphere.

3. A water-resistant motor as in claim 1 wherein the vent includes a fitting for connection to a source of a gas at a pressure above atmospheric pressure.

4. A water-resistant motor as in claim 1 further comprising a splash shield having a central opening receiving the shaft outside the end bell.

5. A water-resistant motor as in claim 4 further comprising a snap ring mounted on the shaft axially outward of the splash shield to retain the splash shield on the shaft, wherein the splash shield forms a receptacle positioned radially outward of the central opening and wherein the snap ring has a radially and axially extending tab that is received in the receptacle so that the splash shield rotates with the shaft.

6. A water-resistant motor as in claim 1 further comprising a splash shield rotatably received on the shaft outside the end bell.

7. A water-resistant motor as in claim 1 wherein the passage extends axially through the end bell.

8. A water-resistant motor as in claim 1 wherein the end bell includes a seat for the rotary bearing bounding the central bore and wherein the passageway is formed by a groove in the seat.

9. A water-resistant motor as in claim 8 wherein the end bell includes a seat for the seal axially outward of the seat for the rotary bearing, wherein the diameter of the seat for the seal is less than the diameter of the seat for the rotary bearing to form a shoulder against which the rotary bearing rests and wherein the passage extends through the shoulder to the central bore.

10. An end bell for a motor, comprising:

an end face extending radially inward from an outer circumference to a central bore defining an axis for a shaft received in the central bore;

a hub extending axially from the end face to an inner end and defining the central bore, wherein the hub includes a bearing seat bounding a portion of the central bore, the bearing seat having a groove extending the axial length of the bearing seat to the inner end of the hub.

11. An end bell as in claim 10 further comprising an outer shell extending axially from the outer circumference of the end face.

12. An end bell as in claim 11 further comprising a vent through the outer shell.

13. An end bell as in claim 12 further comprising an air-pressure fitting in the vent.

14. An end bell as in claim 10 wherein the hub includes a seal seat bounding a portion of the central bore axially closer to the end face, wherein the diameter of the seal seat is less than the diameter of the bearing seat to form a shoulder between the seal seat and the bearing seat and wherein the groove extends through the shoulder.

* * * * *